United States Patent [19]
Burroughs

[11] Patent Number: 5,245,598
[45] Date of Patent: Sep. 14, 1993

[54] METHOD AND APPARATUS FOR SEEK OPERATIONS IN AN OPTICAL RECORDING SYSTEM INCLUDING HOLDING A FOCUS ERROR SIGNAL AT TRACK CROSSINGS

[76] Inventor: Alan C. Burroughs, 851 Arnold Way, San Jose, Calif. 95128

[21] Appl. No.: 544,690
[22] Filed: Jun. 27, 1990
[51] Int. Cl.$^5$ ............................................. G11B 7/085
[52] U.S. Cl. .............................. 369/44.28; 369/44.34; 369/54
[58] Field of Search .................. 369/13, 14, 32, 44.25, 369/44.26, 44.28, 44.32, 44.34, 54, 58

[56] References Cited
U.S. PATENT DOCUMENTS

| | | |
|---|---|---|
| 4,544,838 | 10/1985 | Musha et al. . |
| 4,661,942 | 4/1987 | Yoshimoto et al. . |
| 4,707,648 | 11/1987 | Minami . |
| 4,730,289 | 3/1988 | Saitoh et al. . |
| 4,742,506 | 5/1988 | Fukumoto et al. . |
| 4,764,912 | 8/1988 | Ando et al. . |
| 4,783,590 | 11/1988 | Aoi . |
| 4,814,903 | 3/1989 | Kulakowski et al. . |
| 4,825,428 | 4/1989 | Toki . |
| 4,844,617 | 7/1989 | Kelderman et al. . |
| 4,918,680 | 4/1990 | Miyasaka . |
| 5,034,940 | 7/1991 | Saito et al. ..................... 369/44.34 |

Primary Examiner—Wayne R. Young

[57] ABSTRACT

An apparatus for eliminating tracking/focus crosstalk in optical and magnetooptical disk drive systems by only sampling the focus error signal on land areas between the grooves of the disk when seeking is described. A logic circuit responsive to the system's tracking error signal generates a pulsed sampling signal whenever the laser spot is positioned over land areas. This pulsed sampling signal is used to sample and hold the focus error signal during the time that the pulsed sampling signal is active.

12 Claims, 4 Drawing Sheets

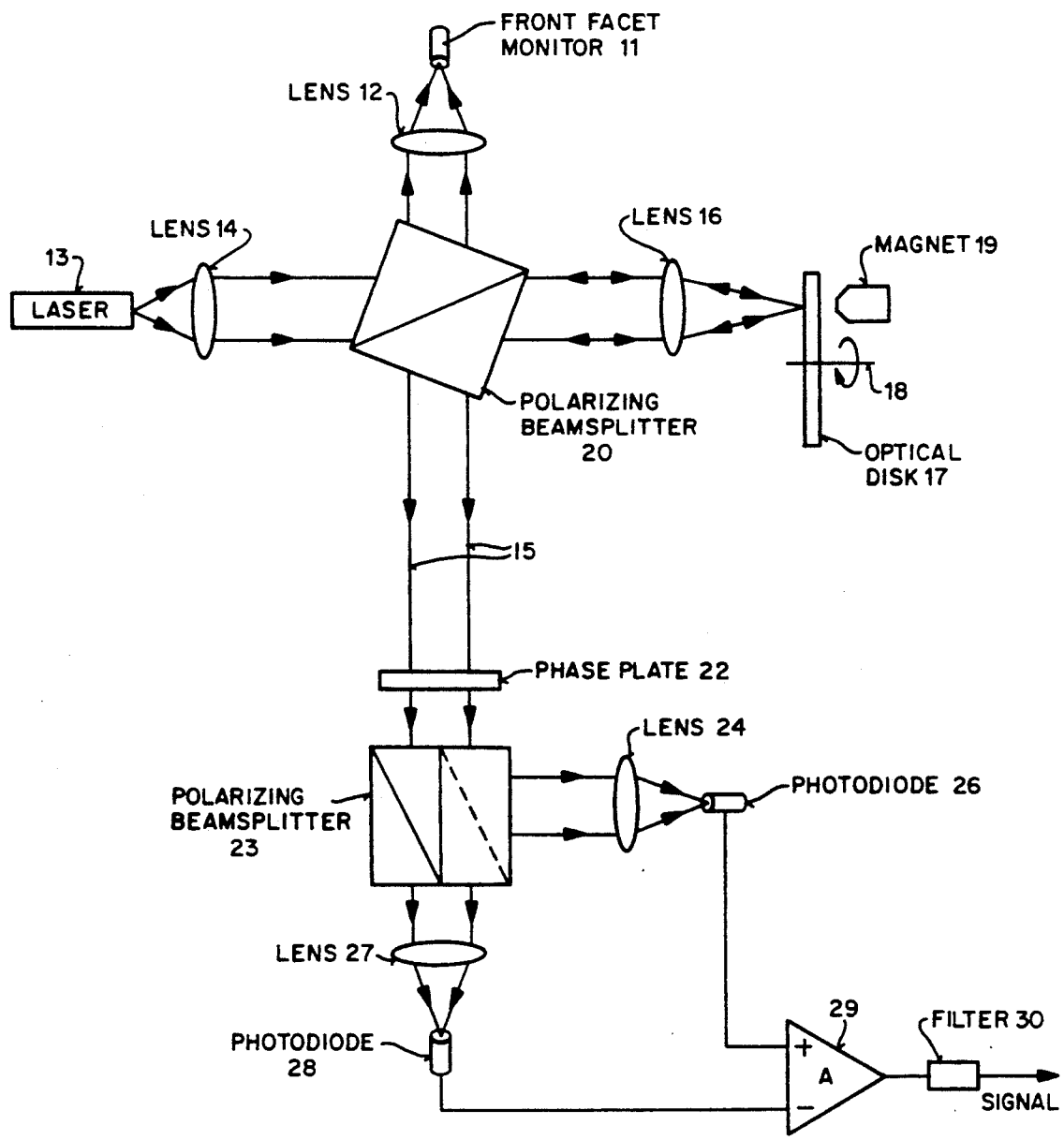
FIG_1

FIG_2A
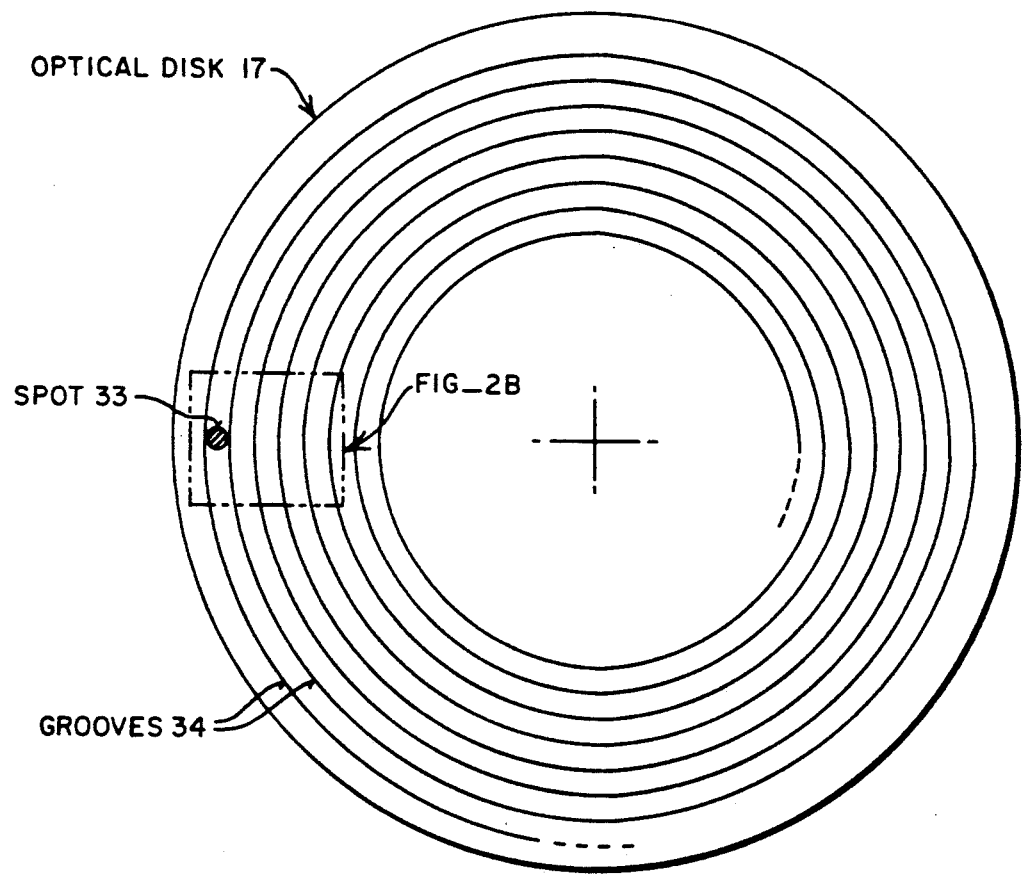
FIG_2B
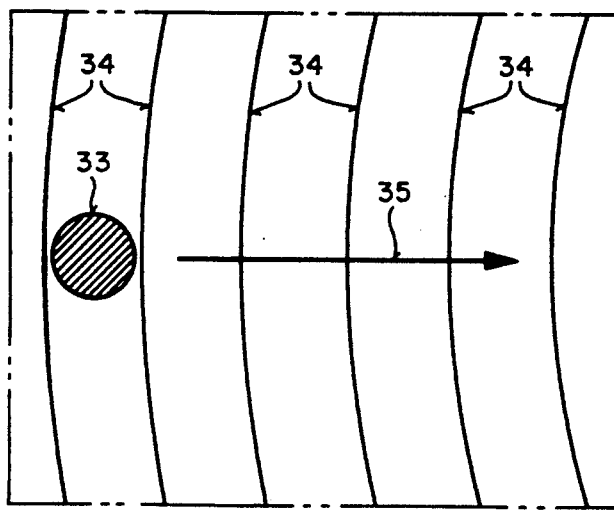

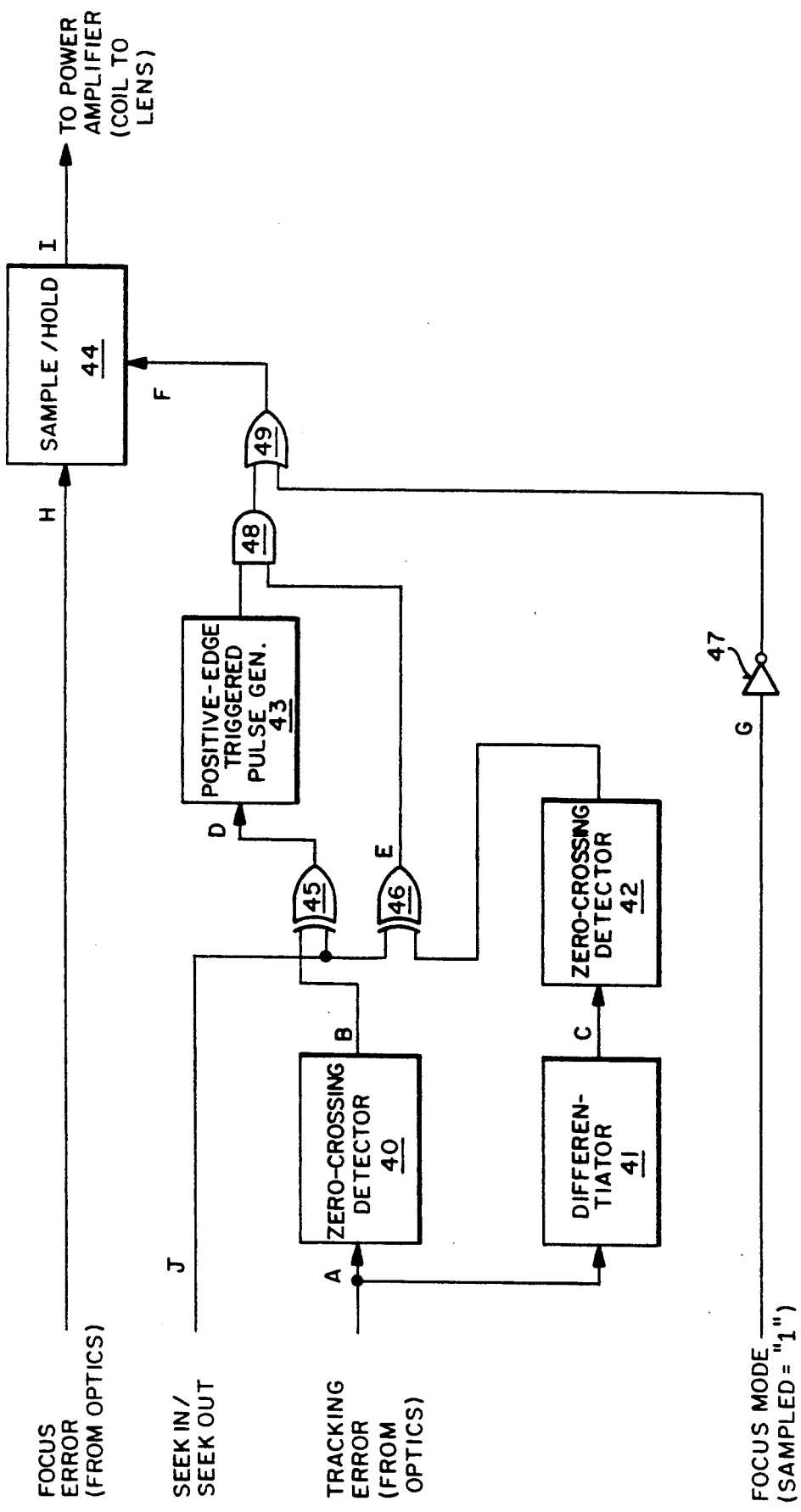

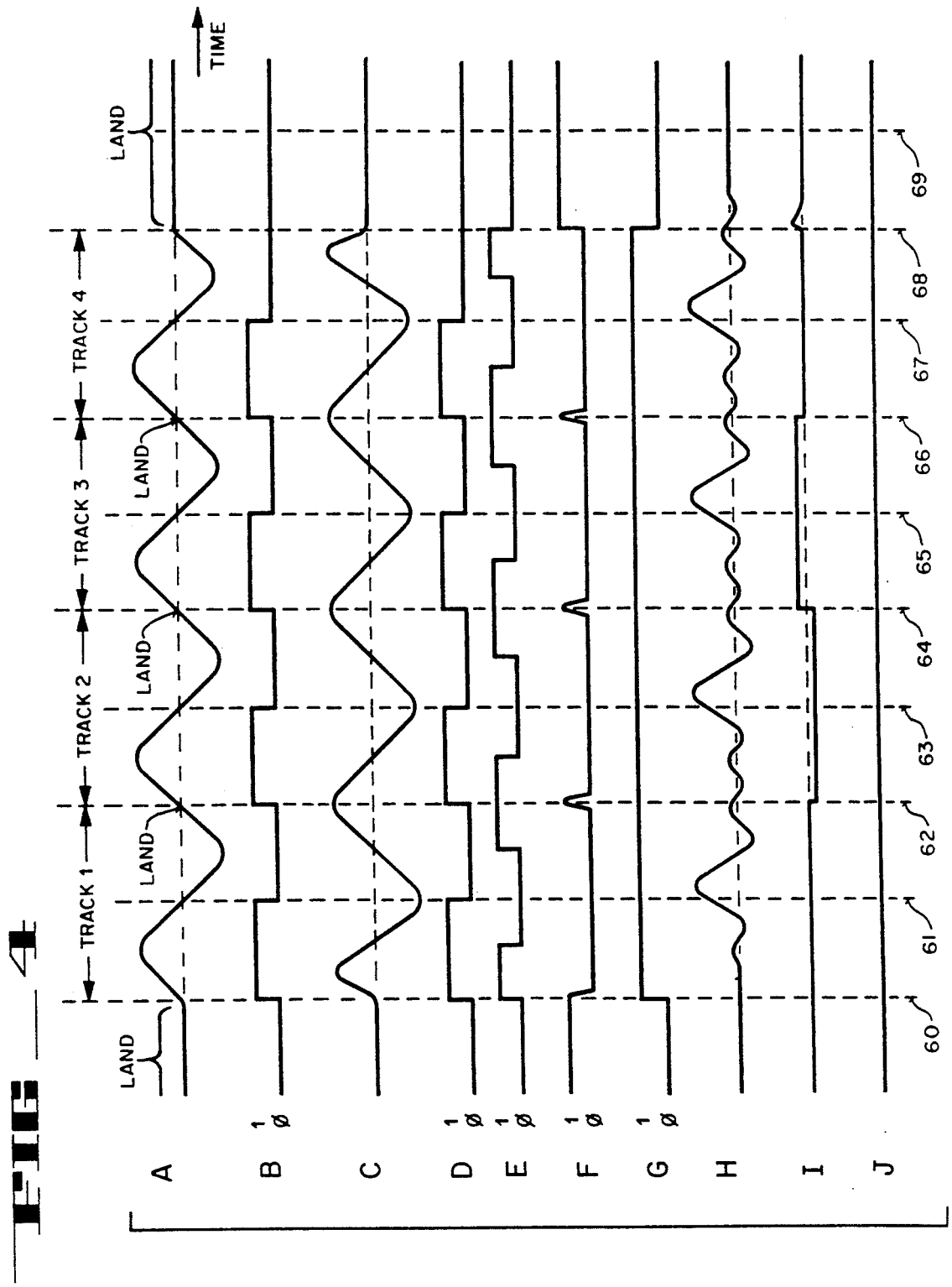

METHOD AND APPARATUS FOR SEEK OPERATIONS IN AN OPTICAL RECORDING SYSTEM INCLUDING HOLDING A FOCUS ERROR SIGNAL AT TRACK CROSSINGS

FIELD OF THE INVENTION

The present invention relates to the field of optical recording systems; more particularly, to techniques for focusing and tracking the system's laser beam as is guided across the surface of the optical medium.

BACKGROUND OF THE INVENTION

Since they first became a reality in the mid-1980's, high-density optical and magnetooptical data storage systems have enjoyed continuing commercial success. As a consequence, there has been a technological push to improve the performance of these drives by increasing the areal density, data rates, access times and the erasability of these disk drive systems. The opportunity for further innovation in this field has lead many companies to actively develop ever more sophisticated optical and magnetooptical disk drive systems.

The basic principles of magnetooptical recording are as follows. A focused laser beam, pulsed to high power for a short time, raises the temperature of a perpendicularly magnetized medium sufficiently for an externally applied magnetic field to reverse the direction of magnetization in the heated region. When the medium returns to a lower temperature the reverse-magnetized domain persists. The orientation of these magnetized domains are sensed by the laser beam during read operations. Erasure of domains may be accomplished by the same thermal process, now aided by an oppositely directed magnetic field. Such magnetooptical recoding systems are described generally in U.S. Pat. Nos. 4,825,428; 4,730,289 and 4,814,903.

Read out of information employs the polar curve effect. Linearly polarized light, reflected from a perpendicularly magnetized medium, is rotated to the left or right, according to the direction of magnetization. By checking the direction of the plane of polarization of the reflected light, magnetization transitions can be read out by the same focussed laser beam that was used for recording the information. Reading operations have virtually no influence on the recorded information because the read laser power is relatively low and causes little temperature rise.

All optical recording systems need some sort of laser focus and tracking servo mechanism to compensate for variations in radial run out and optical path length normally associated with recording mediums. To achieve extremely high track densities, there is an additional requirement that the tracking servo information be embedded within the optical or magnetooptical disk. Generally, this servo information is preformated on the disk substrate during the fabrication process.

For example, many disks have a continuous spiral groove which is used for tracking the laser beam across the disk. Between the grooves is a "land" area wherein the data is written. A tracking signal is derived from the grooves between the tracks so that the laser beam may be made to follow the land areas. As the read spot of the laser moves off the land regions and over the grooves, an error signal is optically generated. This error signal is then fed back to the tracking servo mechanism, which acts to keep the spot centered directly over the land areas.

Focus and tracking servo mechanisms all rely on the divergence of the reflected rays increasing (decreasing) near a photo detector as the disk approaches (moves away from) the objective lens. Most often, this change in divergence is translated into a change in differential output using an ordinary operational amplifier.

Conventional focusing methods include the knife edge, biprism, obscuration, and astigmatic methods. By way of example, in the astigmatic method, a cylindrical lens is placed within the detector module. If the laser beam is out of focus on the disk, its image on a quadrant photo detector will be elliptical, with the major access orientation dependent on the out-of-focus direction. The error signal developed is fed back into the servo controller to adjust the astigmatic lens of the optic system accordingly. Together, the focusing and tracking signals maintain the laser spot in precise position relative to the disk surface and data tracks. Representative focusing and tracking error detection schemes are described in U.S. Pat. Nos. 4,764,912; 4,742,506; 4,783,590 and 4,844,617.

One problem commonly encountered in prior art optical and magnetooptical systems is focus/tracking crosstalk. Crosstalk of the tracking signal into the focus channel arises during seek operations, wherein the read laser spot is moved radially to access data information recorded in any given location on the disk. During a seek, the read spot of the laser is generally moved perpendicular to the circumferential grooves on the disk rather than tangential. This movement is along the radius of the disk. As the spot crosses a groove, the light is scattered or defracted, which results in defocussing of the laser beam. Therefore focus must be continually reacquired after the crossing of each groove. This procedure, whereby the beam is successively defocussed and refocused when crossing a groove, is one of the limiting factors contributing to long access times in prior art systems.

Past approaches to ameliorate this situation include using an external transducer to determine the velocity and/or the position of the laser spot on the disk on a continual basis. However, even with this technique the relative position of the spot on the disk is not always accurately known or predictable. Consequently, access times and reliability continue to suffer. Other attempts to reduce the tracking focus crosstalk typically rely on precise control of the system optics. This involves reducing the astigmatism and wavefront aberrations of the read spot to extremely low levels. The drawback of this technique is that the very tight tolerances, lens astigmatism and wavefront aberrations make the system difficult to align and expensive to manufacture. Often this results in very low production yields (normally less than 50%).

It will be seen later that the present invention virtually eliminates the problem of tracking/focus crosstalk in optical and magnetooptical disk drives by allowing the system to remain at optimum focus during seek operations—thus avoiding degradation in either the tracking or focus error signals. According to the present invention, the read spot on the disk remains at its optimum size and shape at all times for best resolution of the tracking error signal. In addition to greatly improving the optical quality of laser beam, the present invention also greatly simplifies the manufacturing of the optical components in the magnetooptical drive, leading to more reliable operation over temperature extremes and lifetime. Vast improvements in the of the optics system yield (approaching 100%) has brought about a substantial lowering of the cost of manufacture. Other features and advantages will become apparent from the detailed description which follows.

SUMMARY OF THE INVENTION

An apparatus for eliminating tracking/focus crosstalk in a disk drive system is presented. According to the present invention, the focus signal is only sampled on land areas between the grooves of the disk when seeking and is held when the spot is passing over the groove.

In conjunction with one embodiment of the present invention, a magnetooptical disk drive system employs a laser beam to sense magnetic transitions recorded on the optical disk medium. The optical disk itself is organized into circumferential data tracks, also known as land areas. A servo mechanism is utilized for generating focus and tracking error signals which maintain the laser spot in precise position relative to the disk surface and to the data tracks.

A logic means responsive to the tracking error signal generates a pulsed sampling signal whenever the laser spot is positioned over one of the data tracks. This pulsed sampling signal is then coupled to a sample and hold means which samples and holds the focus error signal during the time that the pulsed sampling signal is active. This insures that the servo mechanism only updates focus information when the laser spot is positioned directly over the land areas. Later, when the system returns to read out operations, the present invention is switched so as to allow continuous sampling of the focus error signal.

BRIEF DESCRIPTION OF THE DRAWINGS

The present invention is illustrated by way of example and not limitation in the figures of the accompanying drawings, in which like references indicate similar elements, and wherein:

FIG. 1 is a schematic representation of a magnetooptical recording system used in conjunction with the present invention.

FIG. 2A is a top view of a magnetooptical recording medium into which has been etched a circumferential groove.

FIG. 2B is an expanded view of a portion of the magnetooptical medium of FIG. 2A.

FIG. 3 is a logic diagram of the currently preferred embodiment of the present invention.

FIG. 4(A–J) is a timing diagram of the waveforms appearing at certain designated nodes in the diagram of FIG. 3.

DESCRIPTION OF THE PREFERRED EMBODIMENT(S)

An apparatus for eliminating focus/tracking crosstalk in a disk drive system is described. The invention is useful in both optical and magnetooptical recording systems. In the following description, numerous specific details concerning particular embodiments are set forth in order to provide a more thorough understanding of the present invention. However, it will be obvious to one skilled in the art that the present invention may be practiced without these specific details. In other instances, well-known elements have been shown in block diagram form only to avoid unnecessarily obscuring the present invention.

In addition, while the preferred embodiment of the present invention is discussed in conjunction with its use in a magnetooptical disk drive system, conceptually the invention itself is broad enough to find application in a variety of other recording systems (e.g., optical recording systems). Therefore, the following description should not be considered limiting of the scope and spirit of the present invention.

Referring to FIG. 1, the essential features of the magnetooptical recording system used in accordance with the present invention are diagrammed. In this system, collimated, linearly polarized light from a laser 13 first passes through lens 14 and then through a slightly rotated polarizing beam splitter 20. After passing through beam splitter 20, the light is focused onto magnetooptical disk 17 via lens 16. As magnetooptical disk 17 rotates about axis 18, magnet 19 may be utilized to apply an external magnetic field. This magnetic field reverses the direction of magnetization in the regions of disk 17 heated by the light emanating from laser 13. (Note that the light means in FIG. 1 are shown by lines 15, with the arrows indicating the direction the light is travelling).

The light reflected from disk 17 passes back through lens 16 to polarizing beam splitter 20. Now, beam splitter 20 functions to guide light rays 15 down to the detection system, first passing through a phase plate 22. At the same time, a portion of the reflected light is directed up to through lens 12, which focuses the light onto front facet monitor 11.

The detection system is employed to sense the magnetic transitions and to provide focus and tracking signals that maintain the laser spot in a precise position relative to the disk surface and data tracks. The detection system comprises a second polarizing beam splitter 23 together with all of the associated electronics. Beam splitter 23 is rotated by 45° about the optical axis so that the incident light is split between photodiodes 26 and 28. Lenses 24 and 27 are employed to focus light rays 15 onto photodiodes 26 and 28, respectively.

The performance of the detection system determines the eventual system performance. For example, signals from photodiodes 26 and 28 are fed into an operational amplifier 29 to produce a signal representative of the magnetic transitions stored in disk 17, as well as focussing and tracking signal information. Before the output signal can be fed back to the focusing and tracking servo mechanism, and to the information retrieval circuits associated with the magnetooptical recording system, filter 30 removes noise components from the output of amplifier 29.

Referring now to FIG. 2A, a top view of the magnetooptical disk 17 is shown. Observe that a continuous circumferential groove 34 has been embedded into the top surface of the disk medium. Grooves 34 define the data tracks, or land areas, of disk 17 and are preferably used in conjunction with the present invention to provide a continuous servo signal for improved track-seeking performance. As can be seen, the grooves themselves take the form of a continuous line which runs roughly parallel to the outer circumference of the disk 17. The grooves spiral in towards the center of the disk; all the time maintaining an equal distance from one another. As previously mentioned, the space between the grooves is commonly referred to as the land areas. It is in these land areas that information is written and stored. Laser spot 33 is employed to read the magnetic transitions recorded in these land areas. During a seek operation when spot 33 travels across a plurality of grooves 34 in a generally perpendicular manner, crosstalk is often generated. One object of the present invention is to eliminate this crosstalk phenomena.

FIG. 2B shows an expanded portion of the top view of FIG. 2A. In FIG. 2B the land areas are clearly shown defined between individual grooves 34 while laser spot 33 is shown positioned directly over a land area. This is the typical position of spot 33 during read out of information. Arrow 35 indicates the direction spot 33 must travel during a seek operation. It is appreciated that the distortion produced during read out whenever spot 33 encroaches upon groove 34 is normally used by the tracking servo mechanism to correct the position of spot 33. This maintains the position of spot 33 directly between grooves 34.

A logic diagram of the currently preferred embodiment of the present invention is illustrated in FIG. 3. Various nodes in FIG. 3 have been labelled with capital letters A-G in order to better understand the operating principles of the present invention. The waveforms appearing at nodes A-G are illustrated in FIG. 4, which shows, by way of example, a seek operation across four data tracks. These waveforms, as well as the operation of the circuit of FIG. 3, will shortly be explained in detail.

The logic diagram of FIG. 3 includes a zero-crossing detector 40 and a differentiator 41, both of which receive a tracking error signal such as the one produced by operational amplifier 29 of FIG. 1. Differentiator 41 is coupled to a second zero-crossing detector 42. Both of the detectors 40 and 42 each comprise conventional circuitry which produces a digital transition at its output whenever its input signal crosses a predetermined voltage reference level. The output of detector 40 is coupled to one input of EXCLUSIVE-OR gate 45, while the output of detector 42 is coupled to one input of EXCLUSIVE-OR gate 46. The other input of gates 45 and 46 is coupled to the seek in/seek out signal (labelled "J") generated by the microprocessor controlling the reading, writing and erasing operations of the magnetooptical recording system. For instance, in the preferred embodiment when the laser spot is being moved in towards the center of disk 17, the seek in/seek out signal is set to a logical "0". When seeking out toward the outer circumference of disk 17, the seek in/seek out signal is set to a logical "1".

In FIG. 3, EXCLUSIVE-OR gate 45 is shown coupled to a positive-edge triggered pulse generator 43. Generator 43 produces a positive pulse having a short duration in response to a zero-to-one transition of input signal "D". The output of generator 43 passes through AND gate 48, OR gate 49 and finally to the control input of sample/hold device 44. The other input of AND gate 48 is coupled to the output of EXCLUSIVE-OR gate 46. Meanwhile, the other input of OR gate 49 is coupled to the output of invertor 47.

Invertor 47 receives the focus mode signal (labelled "G") from the controller of the magnetooptical recording system. The focus mode signal permits continuous focussing during times when the laser spot is tracking on a land area, i.e., during read out. In the currently preferred embodiment, continuous sampling of the focus signal occurs when the focus mode signal is set to a logical "0" state. This bypasses the operation of elements 40-43 so that the focus error signal (labelled "H") can be continually sampled by the power amplifier associated with the focussing servo mechanism. Conversely, during seek operations the focus mode signal is set to a logical "1" state so that pulsed sampling of the focus error signal is effectuated.

As mentioned above, focus error signal "H" is shown in FIG. 3 being input to sample/hold unit 44. The output of unit 44 (labelled "I") is available to the power amplifier which controls the coil associated with the focussing servo mechanism of the recording system. Signal "I" thus represents the feedback signal used to correct the focus on the laser spot. Whenever the control input of unit 44 (e.g., input signal "F") is at a logical "1" state (i.e., "high") the focus error signal "H" is allowed to pass directly through unit 44 to the power amplifier. In this situation the signal "I" is said to track signal "H". On the other hand, when signal "F" is at a logical 0 state (i.e., "low") the output of unit 44 is held at the last received input voltage level (at the input voltage sampled just prior to the high-to-low transition of control signal "F"). It is appreciated that each of the individual elements shown in block diagram form in FIG. 3 comprises a well-known circuit. Therefore, details of elements 40-44 have not been described in detail since such details are not essential to the understanding of the present invention.

A better comprehension of the circuit of FIG. 3 is had by considering the example depicted by the waveforms of FIG. 4. FIG. 4 shows a series of waveforms taken from selected nodes of the circuit of FIG. 3 during a seek operation. The seek operation of FIG. 4 assumes that the laser spot must traverse four data tracks.

According to FIG. 4, prior to time 60 the laser spot is employed in a read out operation. That is, the normalized tracking error signal "A" is flat indicating that the spot is directly over a land area. Tracking error signal "A" is input to detector 40 and differentiator 41. Detector 40 outputs a logical "1" whenever the normalized tracking error signal is positive and outputs a logical "0" whenever the tracking error signal is negative. Hence, signal "B" (the output of detector 40) transitions only when the error voltage signal crosses the normalized voltage threshold, i.e., 0 Volts.

Note that when seeking inward, i.e., toward the center of the disk, a zero-crossing having a positive slope indicates a land region. Conversely, when seeking outward, i.e., toward the outer circumference of the disk, a zero-crossing having a negative slope indicates a land area.

Differentiator 41 is used to sense the slope of the tracking error signal and thereby provide redundant information to prevent erroneous zero-crossings from reaching the remainder of the sampling circuit. In other words, differentiator 41 functions to insure that the zero-crossings of the tracking error signal are indeed the correct zero-crossings having the proper slope. To achieve this purpose, differentiator 41 produces an analog output, labelled "C", which has a maximum absolute value at the zero-crossings of the tracking error signal. Zero-crossing detector 42 operates in an identical manner to that of detector 40 except that it receives as its input the output of differentiator 41.

The outputs of both detectors 40 and 42 are coupled to the inputs of EXCLUSIVE-OR gates 45 and 46, respectively, as previously explained. The other input of each of the EXCLUSIVE-OR gates is coupled to seek in/seek out signal, labelled "J". Signal "J" is used to reverse the polarity of the output of zero-crossing detector 40 when seeking in the opposite direction.

Note that this is required because the polarity of the tracking error signal is inverted when the spot travels across the disk in the opposite direction (i.e., from the center to the outer circumference).

The output of EXCLUSIVE-OR gate 45 is illustrated in FIG. 4 as signal "D". Upon the positive etch transition of signal "D", pulse generator 43 produces a sampling pulse (i.e., signal "F") which is then delivered to sample/hold unit 44. The duration of sampling pulse "F" is relatively short. Preferably, its duration is no longer than the minimum time required to reliably acquire a new sample (e.g., several microseconds). A short sampling pulse duration is critical to eliminating crosstalk according to the present invention since a relatively short pulse keeps large focus error transients from being output by unit 44 to the power amplifier.

The idea of course, is to sample the focus error signal when the laser spot is over the land area, and thereby avoiding sampling the focus error when the spot is passing over a groove, i.e., when focus error signal is at its maximum. Note that the focus error signal is at its maximum when the tracking error passes through zero with a negative slope; that is, at times 61, 63, 65 and 67. The focus error signal "H" has usually settled to its minimum value when the laser spot is centered over the land areas; that is, at times 60, 62, 64, 66 and 68.

AND gate 48 receives the output of pulse generator 43 and the output of EXCLUSIVE-OR gate 46, labelled "E". As previously explained, ANDing these two signals insures that the zero-crossings of the tracking error signal have the proper slope for the direction of seek chosen. The sampling pulse is generated at each land area by the pulse generator 43. This pulse is used to sample/hold the focus error signal "H". The focus signal is only sampled when the spot is over the land area, and is held when travelling over a groove area. This prevents erroneous focus information from arriving at point "I", and thus driving the spot at the disk out of focus. As can be seen by the waveform "I" in FIG. 4, the focus error signal actually delivered to the power amplifier circuitry is generally flat; that is, the crosstalk normally generated when crossing grooves has been eliminated. This is a result of sampling the focus error at times 62, 64 and 66 when signal "H" is well-settled.

The foregoing discussion describes how the sampled focus apparatus of the present invention works for the case of a four-track seek. When not seeking, the focus servo mechanism is preferably switched to the continuous sampling mode. Continuous sampling is achieved by driving the focus mode signal, labelled "G", to a logical "0" state. This forces signal "F" high, which in turn permits continuous sampling of the focus error signal by the power amplifier.

Whereas many alternations and modifications of the present invention will no doubt become apparent to a person of ordinary skill in the art after having read the foregoing description, it is to be understood that the particular embodiments shown and described by way of illustration are in no way to be intended to be considered limiting. For example, while the preferred embodiment has been described in conjunction with a particular focussing technique, it should be understood that the present invention may be used with any seek method and with any type of focussing/tracking technique. Furthermore, the present invention can be utilized to eliminate focus/tracking crosstalk for any type of media, i.e., write-once, magnetooptical, etc. Therefore, reference to the details of the preferred embodiment are not intended to limit the scope of the claims which themselves recite only those features regarded as essential to the invention.

Thus, an apparatus for eliminating focus/tracking crosstalk in an optical recording system has been described.

I claim:

1. In an optical disk drive system employing a laser beam to sense transitions recorded on a disk medium, said medium being organized into circumferential data tracks, and wherein said system further includes a servo means for generating focus and tracking error signals and maintaining focus and tracking of a laser spot relative to said data tracks, said servo means also moving said laser spot radially across said data tracks during a seek operation, an improvement for reducing crosstalk between said focus and tracking error signals during said seek operation comprising:

logic means responsive to said tracking error signal for generating a sampling signal whenever said laser spot is positioned over one of said data tracks; and means for holding said focus error signal in response to said sampling signal, the held focus error signal being utilized by said servo means to update the focus of said laser spot.

2. The improvement of claim 1 wherein said sampling signal comprises a voltage pulse having a duration substantially less than the time it takes said laser spot to traverse said one of said tracks.

3. The improvement of claim 2 further comprising a means for continuously sampling said focus error signal.

4. The improvement of claim 3 further comprising means for normalizing said tracking error signal.

5. The improvement of claim 4 wherein said logic means further comprises:

a zero-crossing detector means for producing an output indicative of the relative polarity of said tracking error signal;

pulse generator means for generating said sampling signal upon a predetermined transition of said output.

6. The improvement of claim 1 wherein said disk medium comprises a magnetooptical disk medium and said transitions are magnetically recorded thereon.

7. In a magnetooptical disk drive system employing a laser beam to sense magnetic transitions recorded on a magnetooptical disk medium, said medium being organized into circumferential data tracks, and wherein said system further includes a servo means for generating focus and tracking error signals and maintaining focus and tracking of a laser spot relative to said data tracks, said servo means also moving said laser spot radially across said data tracks during a seek operation, an improvement for reducing crosstalk between said focus and tracking error signals during said seek operation comprising:

circuit means responsive to said tracking error signal for producing an output indicative of the relative polarity of said tracking error signal;

pulse generator means for generating a pulsed sampling signal upon a predetermined transition of said output, said pulsed sampling signal only being generated when said laser spot is positioned directly over one of said data tracks; and means for holding said focus error signal in response to said pulsed sampling signal, the held focus error signal being utilized by said servo means to update the focus of said laser spot.

8. The improvement of claim 7 wherein said pulsed sampling signal comprises a voltage pulse having a duration substantially less than the time it takes said laser spot to traverse said one of said data tracks.

9. The improvement of claim 8 further comprising a means for continuously sampling said focus error signal.

10. The improvement of claim 9 further comprising means for normalizing said tracking error signal.

11. In a magnetooptical disk drive system employing a laser beam to sense magnetic transitions recorded on an optical disk media, said media being organized into circumferential data tracks, and wherein said system further includes a servo means for generating focus and tracking error signals and maintaining focus and tracking of a laser spot relative to said data tracks, said servo means also moving said laser spot radially across said data tracks during a seek operation, a method of reducing crosstalk between said focus and tracking error signals comprising the steps of:

determining when said laser spot is positioned over a data track and generating a signal in response thereto;

sampling said focus error signal during the time when said signal is active;

holding said focus error signal at all other times, the held focus error signal being utilized by said servo means to update the focus of said laser spot.

12. The method according to claim 11 further comprising the step of:

continuously sampling said focus error signal after completing said seek operation.

* * * * *